Patented Aug. 12, 1924.

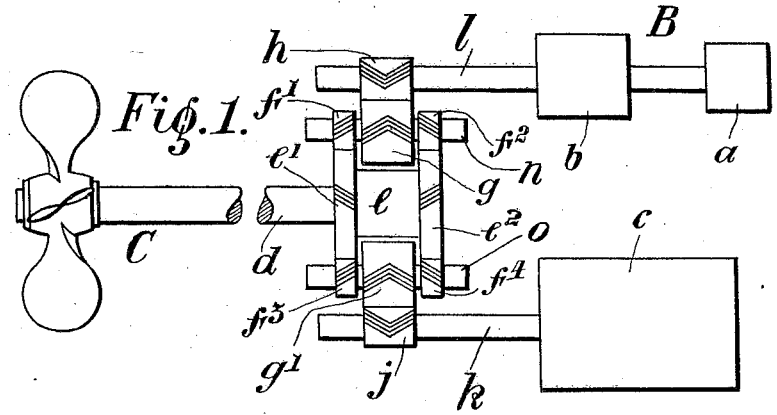
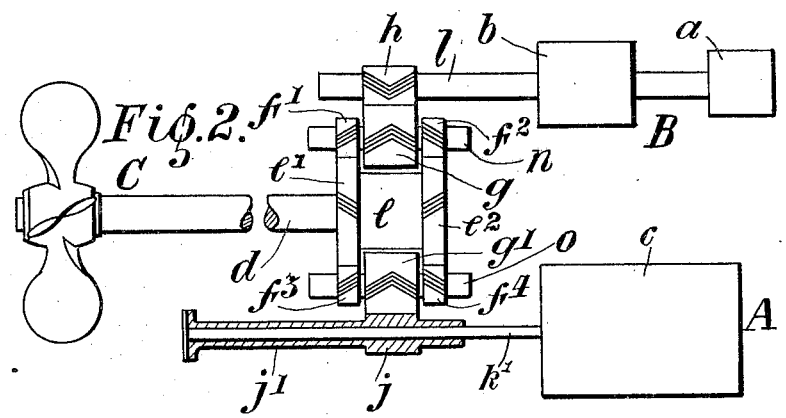
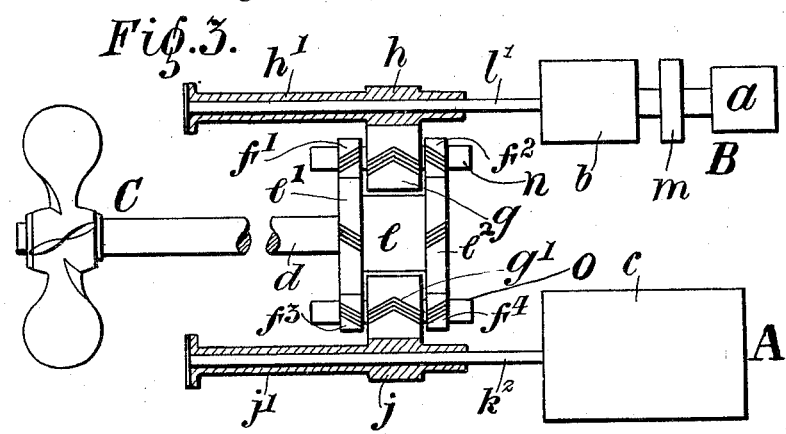

1,504,792

UNITED STATES PATENT OFFICE.

JAMES HENRY SMITH, OF BELFAST, IRELAND, ASSIGNOR TO HIMSELF, WORKMAN, CLARK & COMPANY LIMITED, AND JAMES WILKIE, ALL OF BELFAST, IRELAND.

TOOTHED TRANSMISSION GEARING.

Application filed April 4, 1921. Serial No. 458,495.

*To all whom it may concern:*

Be it known that I, JAMES HENRY SMITH, of Holyrood, Malone Road, Belfast, Ireland, a subject of the King of Great Britain and Ireland, have invented certain new and useful Improvements Relating to Toothed Transmission Gearing, of which the following is a specification.

This invention relates to power drives of the type embodying reduction gear and wherein the power is transmitted by means of shafting.

In such drives, particularly those embodying double reduction gear, vibration of the gear wheels occurs and results in hammering and chattering of the teeth and the generation of abnormally high stresses therein. In some cases the stresses generated are so great as to cause fracture of the material.

In order to determine the origin of this vibration, with its resultant excessive stresses, I have made extensive investigations, and have determined that it is principally due to the torsional oscillations which take place, mainly in the transmission shafts, throughout the system.

Under my invention, in order to eliminate for all practical purposes (hereinafter referred to as "complete elimination") in any such drive, the vibration of the gear wheels due to torsional oscillations in the shafting (hereinafter referred to as "such vibration") the periodicities of the free torsional oscillations of the shafting of all the rotating masses are equalized about the reduction gear, whilst the node of the drive, considered with reference to the free torsional oscillations of the system (when the shafting of each mass is considered as fixed at one extremity thereof at the reduction gear), coincides with the reduction gear. In some cases I may simply reduce such vibration by equalizing the periodicities of the free torsional oscillations of the shafting of only some of the rotating masses connected with the reduction gear, whilst leaving the remainder unadjusted and this would be found advantageous when dealing with existing drives of a complex character where complete elimination could not be readily effected.

To effect the aforesaid equalization I may, in cases where a complete elimination of such vibration is desired, according to the nature and condition of the drive, add to, extend, or otherwise adjust the transmission system so that, when adjusted, the free torsional oscillations of all the shafts connected with the reduction gear, shall have the same periodicity. Preferably, I add to or embody in the drive a torsionally flexible or so called "elastic" shaft or a torsionally flexible coupling or connection which, in strength and torsional flexibility, is equivalent to such a shaft, or I add a flywheel or flywheels to, or otherwise adjust the rotating masses, or adjust any existing shafting or I may take a plurality of any one or more of such steps or adopt any suitable combination thereof.

In the case of new installations I so make and (or) adjust the shafting or parts of the transmission system and (or) include one or more flexible couplings or connections therein or a mass or masses such as a flywheel or flywheels that the free torsional oscillations of the driving and driven shafting, connected with the reduction gear, shall have the same periodicity.

Where, for any good and sufficient reason it is only desired to reduce such vibration, then the shafting or parts of only some of the rotating masses need be added to, extended, or otherwise adjusted as aforesaid.

For the complete elimination of such vibration at the reduction gear, I have found in the case of a ship with geared turbines the following conditions are suitable, that is to say:—

$$\frac{I_1 l_1}{d_1^4} = \frac{I_2 l_2}{d_2^4} = \frac{I_3 l_3}{d_3^4} \ldots = \frac{I_n l_n}{d_n^4}$$

where $I_1, I_2, I_3, \ldots I_n$ represent the effective moments of inertia of the shafts with attached masses and $l_1, l_2, l_3, \ldots l_n$ the lengths, and $d_1, d_2, d_3, \ldots d_n$ the diameters of the shafts embodied in the trnsmission system after the proper adjustments have been made and assuming all the shafting is of similar material, whilst, for the reduction of such vibration, as hereinbefore referred to, these conditions should be satisfied in so far as the shafts adjusted are concerned. In working out this formula the attached masses, e. g. propeller, rotor, etc., are considered as at the ends of the shafts. The periodicities of the free torsional oscillations are calculated in known manner and the shafts are considered as fixed at one extremity thereof at the reduction gear. In cases where, in accordance with the invention, such vibration is to be either completely eliminated, or reduced, by the extension of any existing shaft, the addition to or adjustment of the rotating masses, the employment of a flywheel or flywheels, or the insertion, in the transmission system, of a torsionally flexible shaft, or by the employment of a plurality or a suitable combination of such steps, the necessary or most suitable adjustments may be determined directly by the use of the aforesaid formula. In cases, however, where this condition has to be satisfied by the insertion in the transmission system of a torsionally flexible coupling, or couplings, or by the employment of such coupling, or couplings, in combination with any one or more of the aforesaid adjustments, the torsional flexibility of the coupling or couplings, or the combined torsional flexibility of such coupling or couplings, and other step or steps, adopted must equal that of the shaft, or shafts, which, if substituted therefor would satisfy the same conditions and the dimensions of which may be determined by the aforesaid formula.

I may employ an arrangement of concentric shafting whereby the aforesaid conditions may be satisfied with a minimum of structural alteration of, or departure from, existing arrangements.

In order that the invention may be clearly understood, reference will now be made to the accompanying sheet of diagrams whereon it is illustrated, by way of example, in its application to an ordinary known form of turbine installation for marine propulsion.

Fig. 1 illustrates the installation in its known form, Fig. 2 illustrates the same installation as adjusted in accordance with our invention in order to reduce such vibration, and Fig. 3 illustrates the installation as adjusted in accordance with my invention for the complete elimination of such vibration.

Referring first to Fig. 1, the installation consists in a compound drive wherein high, intermediate, and low pressure turbines $a$, $b$, and $c$, respectively, drive, through prime mover shafts $l$ and $k$ and double reduction helical gear, a propeller shaft $d$. The reduction gear comprises pinions $h$ and $j$ which are securely mounted on the shafts $l$ and $k$ and engage gear wheels $g$ and $g^1$ fast on spindles $n$ and $o$ carrying pinions $f^1$, $f^2$, and $f^3$, $f^4$, respectively, which engage gear wheels $e^1$ and $e^2$ united by a boss $e$ fast upon the propeller shaft $d$.

In this, a typical and well known construction, the rotating driving mass, which I may refer to as A, comprising the shaft $k$ and members attached thereto, is, owing to the weight of the rotor of the low pressure turbine being in excess of the combined weights of the rotors of high and intermediate pressure turbines, in excess of the rotating driving mass, which I may refer to as B, comprising the shaft $l$ and members attached thereto, whilst the propeller shaft $d$ and its attachments, which I may refer to as the rotating driven mass C, differs from that of either the mass A or the mass B. In practice it has been found in a drive of this character there is considerable hammering and chattering of the gear wheels.

Under my invention I can effect, in a drive of this character, the complete elimination of such vibration by equalizing the periodicities of the free torsional oscillations of the shafting (about the reduction gear) of the masses A, B, and C in accordance with any of the methods hereinbefore described. Theoretically the simplest manner, to effect this consists in adjusting the masses A and B and the shafts $l$ and $k$, the former by increasing the mass B and the latter by extending both shafts until the conditions of the formula hereinbefore specified are satisfied and the free torsional oscillations of the shafting of A, B and C brought to the same periodicity. Extension of the shafts $l$ and $k$ may, however, necessitate undersirable structural alterations or modifications, such as removing the reduction gear bodily aft or the turbine bodily forward, of the ship. I overcome this objection in the manner hereinafter described with reference to Figs. 2 and 3.

Fig. 2 illustrates how the shafting of the mass A can be adjusted so that its periodicity of free torsional oscillation can be made to equal that of the shafting of the mass C. A torsionally flexible shaft $k^1$ is attached, at one end, to the rotor shaft of A and, at the other end, to a co-axial hollow shaft or sleeve $j^1$ which carries, at or about its free end, the pinion $j$. With this construction the combined torsional flexibility of the shafts $k^1$ and $j^1$ must equal that of a single shaft which would, by its substitution therefor, satisfy the following condition, that is to say:—

$$\frac{I_1 l_1}{d_1^4} = \frac{I_2 l_2}{d_2^4}$$

where $I_1$ and $I_2$ are, respectively, effective moments of inertia of the shafting with attached masses C and A, $l_1$ and $d_1$ are, respectively, length and diameter of the shaft $d$, and $l_2$ and $d_2$ are, respectively, length and diameter of said single shaft. With this construction, owing to the fact that mass B is not dealt with, such vibration of the gear wheels is not entirely eliminated although it is considerably reduced.

In Fig. 3 is illustrated an arrangement wherein the complete elimination of such vibration is effected by equalizing about the reduction gear the periodicities of the free torsional oscillations of the shafting of all the rotating masses A, B, and C. In this case the rotating masses A and B themselves are adjusted by the addition of a flywheel $m$ to the rotor shaft of $a$, $b$. The rotor shaft of A is extended by the attachment to it of a torsionally flexible shaft $k^2$ which, in turn, is attached to a co-axial hollow shaft $j^1$ carrying the pinion $j$, the same as with reference to Fig. 2, whilst the rotor shaft of B is also extended by the attachment to it of a torsionally flexible shaft $\frac{l^1}{l}$ which, in turn, is attached to a co-axial hollow shaft $h^1$ carrying the pinion $h$, exactly as described with reference to the shaft $k^2$. With this arrangement the shafts $k^2$ and $j^1$ must satisfy the conditions specified with reference to the arrangement for the shafts $k^1$, $j^1$, described with respect to Fig. 2 and the combined torsional flexibility of the shafts $l^1$ and $h^1$ must equal that of a single shaft the insertion of which would enable the following condition to be satisfied, that is to say:—

$$\frac{\frac{I_1 l_1}{4}}{d_1} = \frac{\frac{I_2 l_2}{4}}{d_2} = \frac{\frac{I_3 l_3}{4}}{d_3}$$

where $I_1$, $I_2$; $l_1$, $l_2$; and $d_1$, $d_2$, are as specified with reference to the arrangement as at Fig. 2 and, in addition, $I_3$ represents the effective moment of inertia of the mass B, and $l_3$ and $d_3$ represent, respectively, the length and diameter of said last mentioned single shaft.

The adjustment as aforesaid for masses A, B and C would be also suitable for a single reduction gear.

Having now fully described my invention what I claim and desire to secure by Letters Patent is:—

1. The method of eliminating vibration of the gear wheels in a power drive embodying reduction gear, which consists in equalizing the periodicities of the free torsional oscillations of all the rotating masses about the reduction gear.

2. The method of reducing vibration of the gear wheels in a power drive embodying reduction gear and transmission shafting, which consists in equalizing the periodicities of the free torsional oscillations of the shafting of certain of the rotating masses about the reduction gear by adjusting the dimensions of certain of such shafting.

3. The method of eliminating vibration of the gear wheels in a power drive embodying reduction gear and transmission shafting, which consists in equalizing the periodicities of the free torsional oscillations of the shafting of all the rotating masses about the reduction gear by adjusting the dimensions of certain of said shafting and the inertia of certain of said masses.

4. The method of reducing vibration of the gear wheels in a power drive embodying reduction gear and transmission shafting, which consists in equalizing the periodicities of the free torsional oscillations of the shafting of certain of the rotating masses about the reduction gear by inserting a torsionally flexible connection between one of the masses and the reduction gear.

5. The method of eliminating vibration of the gear wheels in a power drive embodying reduction gear and transmission shafting, which consists in equalizing the periodicities of the free torsional oscillations of the shafting of all the rotating masses about the reduction gear by inserting torsionally flexible connections between certain of the masses and the reduction gear.

6. The method of eliminating vibration of the gear wheels in a power drive embodying reduction gear and transmission shafting, which consists in equalizing the periodicities of the free torsional oscillations of the shafting of all the rotating masses about the reduction gear by inserting torsionally flexible shafts between certain of the masses and the reduction gear and adjusting the inertia of certain of the masses.

7. The method of eliminating vibration of the gear wheels in a power drive embodying reduction gear and transmission shafting, which consists in equalizing the periodicities of the free torsional oscillations of the shafting of the rotating masses about the reduction gear by adjusting the inertia of such masses.

8. The method of reducing vibration of the gear wheels in a power drive embodying reduction gear and transmission shafting, which consists in equalizing the periodicities of the free torsional oscillations of the shafting of some of the rotating masses about the reduction gear by adjusting the inertia of such masses.

9. The method of reducing vibration of the gear wheels in a power drive embodying reduction gear and transmission shafting, which consists in equalizing the periodicities of the free torsional oscillations of the shafting of certain of the rotating masses about the reduction gear by inserting a torsionally flexible shaft and an added mass such as a flywheel between one of the masses and the reduction gear.

10. The method of eliminating vibration of the gear wheels in a power drive embodying reduction gear and transmission shafting, which consists in equalizing the periodicities of the free torsional oscillations of the shafting of all of the rotating masses about the reduction gear by inserting torsionally flexible shafts and added masses such as fly wheels between certain of the masses and the reduction gear.

11. In a power drive, driving and driven masses having equal periodicities of free torsional oscillation and reduction gear operatively connecting such masses.

In testimony whereof I affix my signature in presence of two witnesses.

JAMES HENRY SMITH.

Witnesses:
ANDREW HAMILTON,
HARRY WALTER ALLSOP.